US012789165B2

(12) United States Patent
Kelemen et al.

(10) Patent No.: US 12,789,165 B2
(45) Date of Patent: Nov. 10, 2026

(54) SYSTEMS AND METHODS FOR ENHANCED WEATHERING AND CALCINING FOR $CO_2$ REMOVAL FROM AIR

(71) Applicant: THE TRUSTEES OF COLUMBIA UNIVERSITY IN THE CITY OF NEW YORK, New York, NY (US)

(72) Inventors: Peter Kelemen, Nyack, NY (US); Jennifer Wilcox, Northborough, MA (US); Noah McQueen, Overland Park, KS (US); Greg Dipple, Vancouver (CA); Phil Renforth, Livingston (GB)

(73) Assignees: The Trustees of Columbia University in the City of New York, New York, NY (US); The University of British Columbia, Vancouver (CA); Worcester Polytechnic Institute, Worcester, MA (US)

(*) Notice: Subject to any disclaimer, the term of this patent is extended or adjusted under 35 U.S.C. 154(b) by 1136 days.

(21) Appl. No.: 17/621,752

(22) PCT Filed: Jun. 24, 2020

(86) PCT No.: PCT/US2020/039265

§ 371 (c)(1),
(2) Date: Dec. 22, 2021

(87) PCT Pub. No.: WO2020/263910

PCT Pub. Date: Dec. 30, 2020

(65) Prior Publication Data

US 2022/0347650 A1 Nov. 3, 2022

Related U.S. Application Data

(60) Provisional application No. 63/043,038, filed on Jun. 23, 2020, provisional application No. 62/865,708, filed on Jun. 24, 2019.

(51) Int. Cl.
*B01J 20/10* (2006.01)
*B01D 53/62* (2006.01)
(Continued)

(52) U.S. Cl.
CPC ............ *B01J 20/041* (2013.01); *B01D 53/62* (2013.01); *B01D 53/81* (2013.01); *B01D 53/96* (2013.01);
(Continued)

(58) Field of Classification Search
None
See application file for complete search history.

(56) References Cited

U.S. PATENT DOCUMENTS

| | | | |
|---|---|---|---|
| 8,413,420 | B1 | 4/2013 | Zaromb |
| 9,174,844 | B2 | 11/2015 | Ramkumer et al. |

(Continued)

FOREIGN PATENT DOCUMENTS

| | | | | |
|---|---|---|---|---|
| RU | 2151012 C1 * | 6/2000 | | B09C 1/08 |
| WO | 2018164589 A1 | 9/2018 | | |

OTHER PUBLICATIONS

International Search Report and The Written Opinion of the International Searching Authority, International Application No. PCT/US2020/039265, mailed Nov. 17, 2020.

(Continued)

*Primary Examiner* — Daniel Berns
(74) *Attorney, Agent, or Firm* — Barclay Damon LLP; Anthony P. Gangemi

(57) ABSTRACT

A plurality of carbonation plots are positioned in communication with atmospheric carbon dioxide to facilitate sequestration thereof via ambient weathering. The carbonation plots include a composition rich in metal oxides, which are positioned within the environment, such as on non-arable land, and exposed to the environment to react with
(Continued)

carbon dioxide in the air and form metal carbonates. After about one year of exposure, the composition is recollected and calcined to produce a carbon dioxide stream and replenish the metal oxides, which can be redistributed in the carbonation plots to sequester additional carbon dioxide. The systems and methods of the present disclosure enable capture and redistribution of carbon dioxide for industrial-scale uses for very abundant quarry minerals and enable large-scale low-cost carbon capture projects for municipalities or corporations. $CO_2$ removal from air via these methods and systems have a similar or lower cost than $CO_2$ removal using DAC with synthetic sorbents or solvents.

12 Claims, 4 Drawing Sheets

(51) Int. Cl.

| | |
|---|---|
| ***B01D 53/81*** | (2006.01) |
| ***B01D 53/96*** | (2006.01) |
| ***B01J 20/04*** | (2006.01) |
| ***B01J 20/28*** | (2006.01) |
| ***B01J 20/30*** | (2006.01) |
| ***B01J 20/34*** | (2006.01) |

(52) U.S. Cl.

CPC ......... *B01J 20/10* (2013.01); *B01J 20/28004* (2013.01); *B01J 20/28016* (2013.01); *B01J 20/3021* (2013.01); *B01J 20/3078* (2013.01); *B01J 20/3483* (2013.01); *B01D 2251/304* (2013.01); *B01D 2251/402* (2013.01); *B01D 2251/404* (2013.01); *B01D 2251/602* (2013.01); *B01D 2253/1124* (2013.01); *B01D 2257/504* (2013.01); *B01D 2258/06* (2013.01)

(56) References Cited

U.S. PATENT DOCUMENTS

| | | | |
|---|---|---|---|
| 2004/0213705 | A1 | 10/2004 | Blencoe et al. |
| 2014/0154162 | A1 | 6/2014 | Fan et al. |
| 2016/0031757 | A1 | 2/2016 | Atakan et al. |
| 2017/0037328 | A1 | 2/2017 | Wormser et al. |
| 2017/0096335 | A1 | 4/2017 | Wormser |
| 2018/0201851 | A1 | 7/2018 | Vitse |

OTHER PUBLICATIONS

Hartmann, J., et al., "Enhanced Chemical Weathering As A Geoengineering Strategy To Reduce Atmospheric Carbon Dioxide, Supply Nutrients, And Mitigate Ocean Acidification," Reviews of Geophysics, vol. 51, pp. 113-149, 2013.

Criado, Y.A., et al., "Calcium looping CO2 capture system for back-up power plants," Energy & Environmental Science, vol. 10, Issue 9, pp. 1994-2004, May 2017.

Ren, J., et al., "One-Pot Synthesis of Carbon Nanofibers from CO2," Nano Letters, vol. 15, Issue 9, pp. 6142-6148, Aug. 2015.

Tian, S., et al., "Calcium-looping reforming of methane realizes in situ CO2 utilization with improved energy efficiency," Science Advances, vol. 5, Issue 4, pp. 1-9, Apr. 12, 2019.

Chou, Y.C., et al., "Sorbent Regeneration by Cascade Cyclone Calciner in a Pilot-Scale Calcium Looping Carbon Capture System," International Journal of Environmental Science and Development, vol. 9, No. 5, pp. 131-135, May 2018.

Cho, R., New Report Examines Key Steps Forward in Removing Carbon Dioxide from Air, Center for Climate and Life. Columbia Climate School, pp. 1-4, Dec. 2018.

Adiya, Z.I.S.G., et al., "Steam reforming of shale gas with nickel and calcium looping," Fuel, vol. 237, Issue 1, pp. 142-151, Feb. 2019.

Hangx S J T et al., "Coastal spreading of olivine to control atmospheric CO2 concentrations: A critical analysis of viability", International Journal of Greenhouse Gas Control, Elsevier, Amsterdam, NL, vol. 3, No. 6, pp. 757-767, Dec. 2009.

* cited by examiner

SYSTEMS AND METHODS FOR ENHANCED WEATHERING AND CALCINING FOR $CO_2$ REMOVAL FROM AIR

CROSS REFERENCE TO RELATED APPLICATION(S)

This application is a national stage patent application filing of International Application No. PCT/US2020/039265, filed Jun. 24, 2020, which claims the benefit of U.S. Provisional Application No. 62/865,708, filed Jun. 24, 2019, and 63/043,038, filed Jun. 23, 2020, which are incorporated by reference as if disclosed herein in their entireties.

BACKGROUND

The atmospheric concentration of $CO_2$ has reached 410 parts per million by volume (ppm), an increase of almost 20 ppm in the last 10 years. As current emission levels exceed 35 $GtCO_2$/year, a diverse portfolio of $CO_2$ mitigation technologies must be developed and strategically deployed to avoid a 2° C. increase in Earth's temperature by 2100. Due to global reliance on fossil fuels, this portfolio must include technologies that can remove current and future $CO_2$ emissions from the atmosphere, some of which include the acceleration of natural processes such as the $CO_2$ uptake of oceans and the terrestrial biosphere (soils, forests, minerals), bioenergy with carbon capture and storage (BECCS) and synthetic approaches using chemicals also known as direct air capture with storage (DACS) technologies. Prior to the deployment of these technologies, it is important to develop an understanding of the cost and potential environmental impact.

The contribution of carbon dioxide to global warming is well-documented. Recently, carbon capture methods have been developed for point-of-release carbon capture, e.g., at the smokestack. Previous approaches involved $CO_2$ capture from flue gas and other concentrated sources, in smokestacks or reactors, on time scales of minutes to days. Prior systems also often rely on faster reaction times and higher energy investments, e.g., application of high heat and/or pressure. These solutions are frequently expensive, with optimistic minimum cost predictions of $100/ton $CO_2$ produced, and occasionally employ designer materials that may be difficult to produce.

As discussed above, the Intergovernmental Panel on Climate Change, and other authoritative organizations, have determined that $CO_2$ removal from air (CDR) is necessary to hold global warming to less than 2° C. CDR is far more difficult than $CO_2$ capture from flue gas. Current technology involves "direct air capture" machines (DAC) that remove $CO_2$ from air at a cost of $600/ton $CO_2$.

Enhanced weathering was first proposed by Walter Seifritz in 1990 and is based on the process of natural weathering. In natural weathering, alkalinity-containing minerals are carbonated on geologic timescales (millions of years). The generalized natural weathering reaction is described below:

$$MeO + CO_2 \rightarrow MeCO_3 + \text{Energy}$$

where Me represents a divalent metal cation. Typical cations include magnesium (Mg') and calcium ($Ca^{2+}$), where suitable feedstocks include minerals, such as olivine and serpentine, as well as industrial byproducts, such as mine tailings and fly ash. Since the natural weathering reaction occurs on geological timescales, many researchers have explored various process conditions, pretreatment methods, extraction mechanisms and optimization strategies to expedite the process kinetics as a form of $CO_2$ sequestration.

In addition to natural weathering, calcination is a process by which carbonates are heated to decompose into metal oxides and $CO_2$. The generalized calcination reaction is shown below:

$$MeCO_3 + \text{Energy} \rightarrow MeO + CO_2$$

Similar systems proposing $CO_2$ removal using carbonation reactions have been discussed in previous literature. The American Physical Society, in a 2011 study, evaluated a system where $CO_2$ is absorbed by sodium hydroxide (NaOH) and subsequently reacted with calcium hydroxide ($Ca(OH)_2$) to produce solid calcium carbonate ($CaCO_3$). The $CaCO_3$ is then calcined in an oxy-fired calciner to release the $CO_2$. Other proposed solutions include a continuous looping process including an aqueous potassium hydroxide (KOH) sorbent coupled with a calcium caustic recovery loop. The KOH sorbent reacts with $CO_2$ in the air to produce potassium carbonate ($K_2CO_3$). The $K_2CO_3$ then reacts with $Ca(OH)_2$, produced from $CaCO_3$, to reproduce the KOH and $CaCO_3$. These types of aqueous calcium looping systems have been primarily evaluated using calcium-based sorbents in aqueous conditions (in the form of $Ca(OH)_2$). Additionally, proposed ocean liming processes deposit lime (produced from calcined carbonate minerals) into the ocean to react with carbonic acid currently in the ocean. This process increases oceanic pH and leads to the dissolution of more $CO_2$ into the ocean water, reducing the atmospheric concentration of $CO_2$. Additional systems utilizing mineral carbonation reactions have looked at various forms of carbon mineralization as a method to capture $CO_2$ from more concentrated point sources, such as power plants.

SUMMARY

Some embodiments of the present disclosure are directed to a system utilizing alkalinity to sequester carbon dioxide ($CO_2$) from the atmosphere including at least one carbonation plot including a composition including one or more metal oxides, the at least one carbonation plot positioned to expose the composition to ambient weathering; a feedstock source including a feedstock, wherein at least a portion of the one or more metal oxides is derived from the feedstock; a preprocessing system in communication with the feedstock source, the preprocessing system configured to reduce the feedstock to a desired particle size; a calciner configured to heat the feedstock, composition, or combinations thereof, to a predetermined temperature; and a composition recycling system to transport composition to the calciner and return calcined composition to the at least one carbonation plots.

In some embodiments, the system is configured to maintain exposure of the composition to ambient weathering for a year. In some embodiments, the system includes greater than about 5 carbonation plots. In some embodiments, the system includes greater than about 3,500 carbonation plots. In some embodiments, the at least one carbonation plot includes greater than about 20,000 tons of metal oxides available for ambient weathering. In some embodiments, the average particle size of the composition is about 20 μm. In some embodiments, the composition is included in the carbonation plot as a layer, wherein the layer has a thickness of about 0.1 m. In some embodiments, the feedstock includes magnesite, peridotite, serpentinite, olivine, serpentine, brucite, sodium carbonate, dunite, calcite, dolomite, wollastonite, pyroxenes, or combinations thereof.

Some embodiments of the present disclosure are directed to a method for utilizing alkalinity to sequester carbon dioxide ($CO_2$) from the atmosphere including providing a composition including one or more metal oxides; distributing the composition into a plurality of carbonation plots, the plots positioned to expose the composition to ambient weathering; capturing atmospheric $CO_2$ via the one or more metal oxides to produce an ambiently weathered composition; calcining the ambiently weathered composition to generate a calcined composition and a $CO_2$ stream; and distributing the calcined composition into the plurality of carbonation plots. In some embodiments, the method includes stirring the composition within the plurality of carbonation plots.

In some embodiments, the composition is at least in part composed of processed feedstock, wherein the feedstock includes magnesite, peridotite, serpentinite, olivine, serpentine, brucite, sodium carbonate, dunite, calcite, dolomite, wollastonite, pyroxenes, or combinations thereof. In some embodiments, the one or more metal oxides includes MgO, CaO, $Na_2O$, or combinations thereof. In some embodiments, the plurality of carbonation plots includes greater than about 5 carbonation plots. In some embodiments, the plurality of carbonation plots includes greater than about 20,000 tons of metal oxides available for ambient weathering. In some embodiments, the composition is distributed in the plurality of carbonation plots as a layer, wherein the layer has a thickness of about 0.1 m.

In some embodiments, capturing atmospheric $CO_2$ via the one or more metal oxides to produce an ambiently weathered composition includes recollecting the composition as the ambiently weathered composition after about 1 year of exposure to the atmosphere.

In some embodiments, providing a composition includes grinding the feedstock to an average particle size of about 20 μm. In some embodiments, providing a composition includes calcining the feedstock to produce an additional $CO_2$ stream and a calcined feedstock including the one or more metal oxides.

In some embodiments, calcining the ambiently weathered composition to generate calcined composition and a $CO_2$ stream includes calcining the ambiently weathered composition for a duration between about 30 minutes and about 2 hours. In some embodiments, calcining the ambiently weathered composition to generate calcined composition and a $CO_2$ stream includes calcining the ambiently weathered composition at a temperature between about 500° C. and about 1200° C.

Some embodiments of the present disclosure are directed to a method for utilizing alkalinity to sequester carbon dioxide ($CO_2$) from the atmosphere including providing a source of feedstock; processing the feedstock to maximize metal oxides in the feedstock and reaction rate of the feedstock with atmospheric $CO_2$; providing the processed feedstock to a network of carbonation plots configured to expose the processed feedstock to ambient weathering; stirring a contents of the carbonation plots; capturing atmospheric $CO_2$ via the one or more metal oxides for about 1 year to produce an ambiently weathered composition; calcining the ambiently weathered composition at a temperature between about 500° C. and about 1200° C. to generate a $CO_2$ stream and regenerate metal oxides as a calcined composition; and distributing the calcined composition into the plurality of carbonation plots. In some embodiments, the feedstock includes magnesite, peridotite, serpentinite, olivine, serpentine, brucite, sodium carbonate, dunite, calcite, dolomite, wollastonite, pyroxenes, or combinations thereof, and the one or more metal oxides includes MgO, CaO, $Na_2O$, or combinations thereof.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DESCRIPTION

Figure 1:
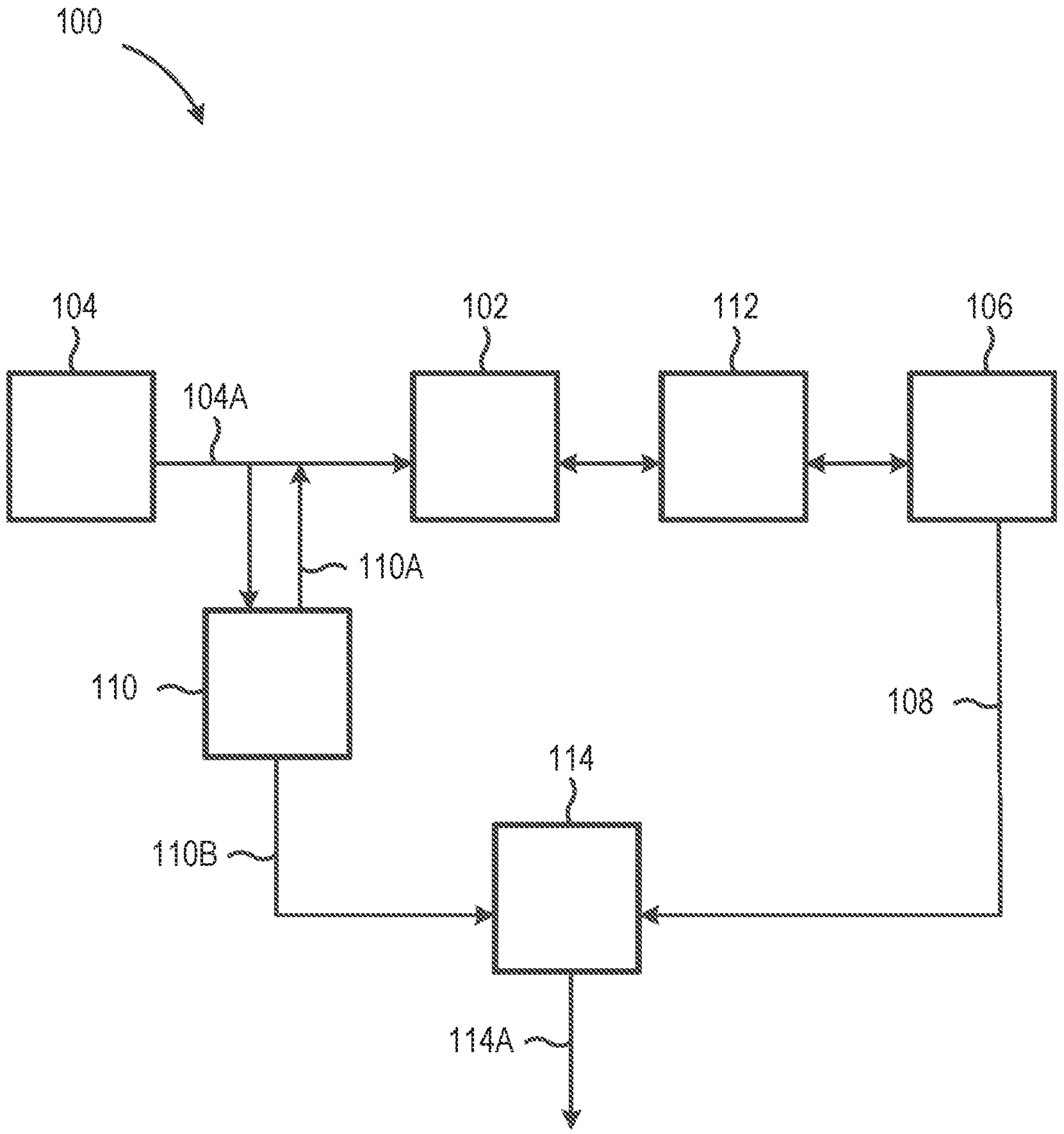
FIG. 1 is a schematic representation of a system utilizing alkalinity to sequester carbon dioxide according to some embodiments of the present disclosure.

Referring now to FIG. 1, aspects of the disclosed subject matter include a system 100 utilizing alkalinity to sequester a target compound, e.g., carbon dioxide ($CO_2$). In some embodiments, system 100 sequesters the target compound directly from the atmosphere. In some embodiments, system 100 sequesters the target compound directly from the atmosphere via reaction of the target compound with a composition in the system. In some embodiments, the reaction is a carbonation reaction.

In some embodiments, system 100 sequesters $CO_2$ directly from the atmosphere. In these embodiments, sequestering of $CO_2$ by system 100 contributes to an overall reduction in atmospheric $CO_2$ concentration. In some embodiments, system 100 sequesters $CO_2$ from one or more extra-systemic effluent streams, e.g., evolved from industrial processes outside of or independent from system 100. In some embodiments, energy for operating components of system 100 can be provided via any suitable source, grid electricity, solar electricity, combustion of one or more fuels, e.g., to power an oxy-fired system component, etc., or combinations thereof.

In some embodiments, system 100 includes at least one carbonation plot 102. In some embodiments, system 100 includes a plurality of carbonation plots 102. "Carbonation plot," as used herein, includes single contiguous plots, as well as semi- or non-contiguous plots that are then grouped or processed together to effectively act as a single plot. In some embodiments, carbonation plots 102 include a composition that sequesters a target compound, e.g., $CO_2$. In some embodiments, the carbonation plots 102 are positioned and configured to expose the composition to ambient weathering. In some embodiments, the environment in which the ambient weathering occurs, e.g., the location and orientation of carbonation plots 102, is configured to maximize the temperature at the surface of the composition. As used herein, the term "ambient weathering" is used to refer to the sequestration of a target compound, e.g., $CO_2$, directly from the atmosphere at substantially ambient temperature and substantially atmospheric pressure. In some embodiments, carbonation plots 102 are positioned in the environment, e.g., on grasslands, deserts, mountainsides, etc. In some embodiments, carbonation plots 102 are clustered into a group. In these embodiments, and as will be discussed in greater detail below, the clustered carbonation plots 102 enable centralized implementation of other system components for more efficient operation of the overall system. In some embodiments, carbonation plots 102 are clustered in a plurality of separate groups. In some embodiments, a plurality of carbonation plot groups are distributed throughout a region of the planet, e.g., non-arable land in the Western United States. In some embodiments, a plurality of carbonation plot groups are distributed throughout the planet. In some embodiments, system 100 includes a sufficient number of carbonation plots 102 to hold a sufficient amount of the composition to sequester a desired amount of target compound, e.g., $CO_2$. In some embodiments, system 100 includes more than about 2, 3, 4, 5, 6, 7, 8, 9, 10, 20, 30, 40, 50, 60, 70, 80, 90, 100, 200, 300, 400, 500, 1000, 1,500, 2,000, 2,500, 3,000, 3,500, 4,000, 4,500, 5,000, or 10,000 carbonation plots 102. In some embodiments, system 100 includes greater than about 5 carbonation plots. In some embodiments, system 100 includes greater than about 3,500 carbonation plots.

In some embodiments, the composition includes one or more metal oxides. In some embodiments, the one or more metal oxides include MgO, CaO, $Na_2O$, or combinations thereof. The composition may also include filler material, e.g., materials that do not actively react with the target compound, reacted metal oxides, e.g., metal carbonates, silicates, etc., and other materials without departing from the scope of the invention. In some embodiments, carbonation plot 102 includes greater than about 1,000, 2,000, 3,000, 4,000, 5,000, 10,000, 15,000, 20,000, 25,000, 30,000, 35,000, 40,000, or 50,000 tons of metal oxides. In some embodiments, carbonation plot 102 includes greater than about 1,000, 2,000, 3,000, 4,000, 5,000, 10,000, 15,000, 20,000, 25,000, 30,000, 35,000, 40,000, or 50,000 tons of metal oxides available for ambient weathering. In some embodiments, carbonation plot 102 includes greater than about 20,000 tons of metal oxides available for ambient weathering. In some embodiments, the composition is included in the carbonation plot as a layer. In some embodiments, the layer has a thickness of about 0.01 m, 0.02 m, 0.03 m, 0.04 m, 0.05 m, 0.06 m, 0.07 m, 0.08 m, 0.09 m, 0.1 m, 0.2 m, or 0.3 m. In some embodiments, the layer has a thickness of about 0.1 m. In some embodiments, system 100 is configured to maintain exposure of the composition to ambient weathering for about a month, 2, months, 3 months, 4 months, 5 months, 6 months, 7 months, 8 months, 9 months, 10 months, 11 months, a year, or about 1.5 years. In some embodiments, system 100 is configured to maintain exposure of the composition to ambient weathering for about a year.

In some embodiments, system 100 includes a feedstock source 104 including a feedstock, e.g., feedstock stream 104A. In some embodiments, the feedstock includes magnesite, peridotite, serpentinite, olivine, serpentine, brucite, sodium carbonate, dunite, calcite, dolomite, wollastonite, pyroxenes, or combinations thereof. In some embodiments, at least a portion of the metal oxides in the composition of carbonation plots 102 is derived from the feedstock. In some embodiments, the feedstock itself is composed at least partially of metal oxides which can be applied to carbonation plots 102 for use in sequestering $CO_2$, as will be discussed in greater detail below. In some embodiments, feedstock is processed to form metal oxides, which are then applied to carbonation plots 102 for use in sequestering $CO_2$, as will also be discussed in greater detail below.

In an exemplary embodiment, system 100 uses about 500,000 tons magnesite ($MgCO_3$) feedstock. Worldwide magnesite production is 27.3 $MtMgCO_3$/yr, indicating that in these exemplary embodiments, system 100 would use 2% of the global magnesite production. Without wishing to be bound by theory, to sequester $1GtCO_2$ would include 2.5 Gt $MgCO_3$, which comes out to be 100 times the global production of magnesite per year.

In some embodiments, system 100 includes one or more calciners 106. In some embodiments, system 100 includes a plurality of calciners 106. In some embodiments, calciners 106 include an oxy-fired calciner, an electric-fired calciner, a solar calciner, e.g., "carbon-free" calciner, etc., or combinations thereof. Calciners 106 are configured to heat the feedstock, composition, or combinations thereof, to a predetermined temperature. In some embodiments, calciners 106 hear the feedstock/composition for a duration between about 30 minutes and about 2 hours In some embodiments, the predetermined temperature is between about 500° C. and about 1200° C. Heat from calciners 106, applied to the feedstock and/or composition, replenishes metal oxides from metal carbonates, e.g., those formed via ambient weathering, which can then be returned to carbonation plots 102 to sequester additional $CO_2$. A general calcination reaction of magnesite is provided below:

$$MeCO_3 + Energy \rightarrow MeO + CO_2$$

In some embodiments, calciner 106 is configured to calcine ambiently weathered composition to regenerate metal oxides in the composition and evolve a $CO_2$ product stream 108, as will be discussed in greater detail below. In some embodiments, $CO_2$ product stream 108 includes $CO_2$ evolved from the operation of calciner 106 itself, e.g., via combustion of one or more fuels.

In an exemplary embodiment, calciner 106 is an oxy-fired calciner that includes two additional pieces of equipment: an air separation unit (to ensure pure oxygen is fed to the system) and a condenser (to condense water from the gaseous stream leaving the calciner). This allows for the capture of $CO_2$ produced from fuel combustion. The complete combustion reaction is illustrated below using methane.

$$CH_4\ (g) + 2\ O_2\ (g) \rightarrow CO_2\ (g) + H_2O\ (g) + Energy$$

Following the combustion reaction, the gas stream is fed into the condenser where the water is removed from the process stream. After condensing out the water, both the $CO_2$ captured from the air and the $CO_2$ produced from natural gas combustion can be compressed and stored. Without wishing to be bound by theory, in this condensing step, 0.5 t of water are produced for every $tCO_2$ captured from the air. This water can be utilized in the process or sold as a byproduct.

In some embodiments, system 100 includes a preprocessing system 110 in communication with feedstock source 104 and feedstock stream 104A. In some embodiments, preprocessing system 110 includes one or more components configured to grind the feedstock to a desired average particle size. In some embodiments, the desired average particle size is about 10 μm, 20 μm, 30 μm, 40 μm, 50 μm, 75 μm, 100 μm, 200 μm, 300 μm, 400 μm, 500 μm, 750 μm, or 1 mm.

In some embodiments, the average particle size of the composition is about 20 μm. In some embodiments, preprocessing system 110 includes one or more mills, e.g., a ball mill, crushers, e.g., a cone crusher for an initial feedstock size reduction, or combinations thereof. In general, the number of grinders (and subsequent grinding energy) depends on the desired particle size. By way of example, in a first grinding step, a cone crusher could reduce the particle size from an inlet of 100 mm down to 20 mm. From this stage, two ball-milling steps could reduce the size to 20 μm. In some embodiments, preprocessing system 110 includes an additional calciner for calcining feedstock.

In some embodiments, preprocessing system 110 includes a first outlet stream 110A including processed feedstock. In some embodiments, preprocessing system 110 includes a second outlet stream 110B including a $CO_2$ product stream evolved from processing the feedstock, e.g., from the additional calciner. In some embodiments, the preprocessing system 110 utilizes calciner 106 discussed above to process feedstock, e.g., before applying the feedstock to carbonation plots 102 as part of the composition therein. In such embodiments, $CO_2$ product stream 108 is used as second outlet stream 110B.

In some embodiments, system 100 includes a composition recycling system 112. In some embodiments, composition recycling system 112 is configured to transport composition, e.g., ambiently weather composition rich in carbonates, to calciner 106 and return calcined composition, e.g., recycled composition rich in metal oxides, to carbonation plots 102. In some embodiments, composition recycling system 112 includes one or more conveyors. In some embodiments, the one or more conveyors are electric. In some exemplary embodiments, with looping, ultramafic rocks will be increasingly divided into materials such as $MgCO_3$, minor $CaCO_3$, and $SiO_2$ after each weathering step, and the calcining residue will become richer and richer in MgO and CaO, and thus more reactive and useful as feedstock for the next cycle.

In some embodiments, system 100 includes a postprocessing system 114. In some embodiments, postprocessing system 114 collects $CO_2$ product streams, e.g., stream 108 and 110B, for subsequent utilization and/or storage in product stream 114A. In some embodiments, postprocessing system 114 includes any suitable combination of system components to achieve the desired disposition of $CO_2$ produced by system 100. In some embodiments, postprocessing system 114 facilitates compression, transportation, geological sequestration, and/or utilization of produced $CO_2$. In some embodiments, produced $CO_2$ is stored underground. In some embodiments, produced $CO_2$ is used to make "net zero" carbon products, e.g., $CO_2$ in greenhouses and beverages, $CO_2$-added concrete, air-to-fuels, etc.

Figure 2:
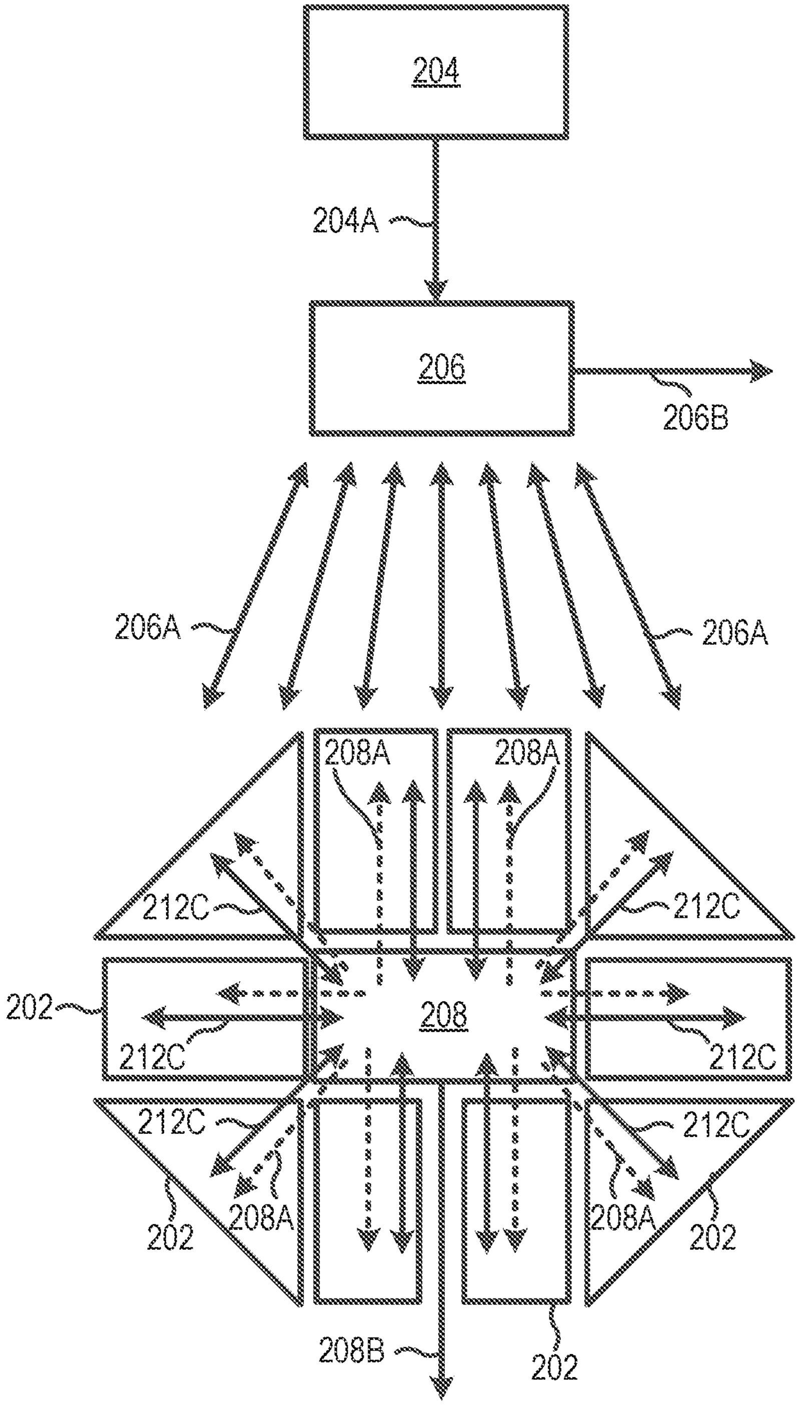
FIG. 2 is a schematic representation of a system utilizing alkalinity to sequester carbon dioxide according to some embodiments of the present disclosure.

Referring now to FIG. 2, an exemplary embodiment of system 100 is shown with 10 carbonation plots 202, which are filled with a composition including feedstock provided from a feedstock source 204. The operation of this exemplary system can be generally divided into various parts including mineral acquisition, physical preprocessing, calcination, on-site transportation, carbonation, mineral recollection, etc. In this exemplary system, an initial magnesite feedstock stream 204A is fed into a preprocessor 206 where the mineral is ground and heated, e.g., via one or more crushers/mills and one or more calciners, to produce a metal oxide stream 206A (including MgO) and a $CO_2$ product stream 206B. Alternatively, to produce MgO for weathering, one could calcine serpentinite, driving off $H_2O$ and minor $CO_2$, to create reactive material composed of MgO and amorphous $Mg_3Si_2O_7$. After a few weathering and calcining cycles, this would become MgO and $SiO_2$. Metal oxide stream 206A is then distributed to carbonation plots 202 as the composition for sequestering atmospheric $CO_2$ via carbonation reactions, i.e., ambient weathering.

In this embodiment, conveyors 212C act as the connection between carbonation plots 202 and a calcination plant 208. Conveyors 212C will transport the carbonation product from plots 202 back into the calcination plant once the year has elapsed, as well as spread calcined mineral provided therefrom.

In this embodiment, 10 conveyors are used. As discussed above, metal oxide stream 206A is transported to carbonation plots 202 where it is deposited and allowed to carbonate over a given timescale, e.g., over the course of a year. At least a portion of the ambiently weathered composition in carbonation plots 202 is then recollected, primarily in the form of magnesium carbonate, and transported to calciner 208. In some embodiments, the material is re-fed to preprocessor 206 with additional magnesite feedstock 204A to make up for environmental losses. In some embodiments, the material is re-ground in preprocessor 206. In the preprocessor 206 and calciner 208, the material is once again heated to regenerate MgO, e.g., as metal oxide stream 208A. In an exemplary embodiment, a $CO_2$ stream 208B is generated from ambiently weathered composition in addition to that previously generated at 206B in processing the feedstock. In some embodiments, the process continues cyclically. In some embodiments, the process continues semi-continuously. In some embodiments, the process continues continuously. Overall, in this embodiment, $MgCO_3$ feedstock is calcined to produce caustic MgO and high-purity $CO_2$. The MgO is spread over land to react with atmospheric $CO_2$ to reform magnesite and other Mg-carbonate minerals over the course of a year. After renewed formation of Mg-carbonate minerals, it is collected and calcined again, producing a nearly pure stream of $CO_2$ together with an amorphous, solid MgO residue. The resulting MgO can be exposed to weathering again, and so on.

When analyzing the effectiveness of system 100, such as the embodiment shown in FIG. 2, the produced MgO is assumed to have the same aqueous reactivity as mineral brucite ($Mg(OH)_2$). The rate of formation of magnesium carbonate via reaction of aqueous brucite is on the order of $3\times10^{-8}$ moles $m^{-1}$ $s^{-1}$ when mineral dissolution kinetics are rate limiting. Thus, for example, grains of brucite with a diameter of 10 to 100 microns ($1.7\times10^{-1}$° to $1.7\times10^{-7}$ moles, $1.25\times10^{-9}$ to $1.25\times10^{-7}$ $m^2$, assuming spherical grains), are predicted to be completely transformed to magnesite in less than a year. In practice, larger porous grains with a higher surface area to volume ratio than spheres would also be transformed in a year.

Existing data suggest that under conditions of near 100% relative humidity, conversion of MgO to $Mg(OH)_2$ can occur on the order of hours, indicating over the course of a year hydration reaction is not rate limiting. This conversion is further dependent on the specific surface area and relative humidity of the system (or water vapor partial pressure) with higher partial pressures resulting in faster conversion. Since conversion of MgO to $Mg(OH)_2$ in the presence of water is much faster than the rate of carbonation of $Mg(OH)_2$, it was assumed the carbonation step is rate limiting. Thus, the rate of carbonation can be assumed as the effective rate for the system of FIG. 2.

The major process assumptions and parameters for the upper and lower bounds of the analysis are outlined in Table 1. Based on these considerations, it was assumed that 20 μm particles of caustic magnesia achieve 90% carbonation within a year. The number of carbonation plots in the analysis is optimized to keep the calciner continuously operational, avoiding startup and shutdown expenses. The upper and lower bounds correspond to the effect of each parameter on overall process cost, not necessarily the magnitude of each parameter value.

TABLE 1

Assumptions and parameters used for the upper and lower bounds in the process model

| Parameter/Assumption | Value: Lower Bound | Value: Upper Bound |
|---|---|---|
| **Calcination** | | |
| Calcination Temperature [° C.] | 600 | 1200 |
| Calcination Time [hr] | 2 | 0.5 |
| Time Between Calcination Loads [hr] | 0.25 | |
| Heat of Decarbonation [kJ mol$^{-1}$] | 118 | |
| Kiln Efficiency [%] | 90 | |
| Calcination Efficiency [%] | 90 | |
| **Carbonation** | | |
| $CO_2$ Uptake Capacity [mol $CO_2$ molMgO$^{-1}$] | 1 | |
| MgO Layer Thickness [m] | 0.1 | |
| Particle Size [μm] | 20 | |
| Environmental Losses [% cycle$^{-1}$] | 5 | 10 |
| Carbonation Efficiency [%] | 90 | |
| Stirring Equipment [Acres Unit Equipment$^{-1}$] | 125 | |
| Number of Plots | 3504 | 10512 |
| **Energy Costs and Emissions** | | |
| Natural Gas [$ GJ$^{-1}$] | 3.5 | |
| Natural Gas [kg $CO_2$ GJ$^{-1}$] | 59 | |
| Gasoline [$ gallon$^{-1}$] | 2.60 | |
| Gasoline [kg $CO_2$ gallon$^{-1}$] | 8.89 | |
| Grid Electricity [$ GJ$^{-1}$] | 16.7 | |
| Grid Electricity [kg $CO_2$ GJ$^{-1}$] | 150 | |
| Solar Electricity [$ GJ$^{-1}$] | 16.7 | |
| Future Solar Electricity [$ GJ$^{-1}$] | 8 | |
| Solar Electricity [kg $CO_2$ GJ$^{-1}$] | 6.9 | |
| Raw Material (Mining) Emissions [kg $CO_2$ tMineral$^{-1}$] | 10 | |
| **Economic Parameters** | | |
| Capacity Factor [%] | 90 | |
| Plant Economic Lifetime [yr] | 20 | |
| Discount Rate [%] | 4 | 11 |
| Capital Recovery Factor [%] | 7.4 | 12.6 |

Three scenarios were explored in this analysis, related to the type, cost and emissions of electricity used. The first scenario used grid electricity, assuming electricity is taken directly from the commercial grid. The second scenario used solar electricity, assuming electricity is obtained via utility solar plants at current market price. The third scenario used a projected cost of solar electricity, assuming a decrease in utility solar electricity cost by 2030 as projected by the DOE.

The scale of operation used 50,000 tons of magnesite-including raw mineral per carbonation plot. Here the emissions value associated with mining magnesite was 10 $kgCO_2$ $tMgCO_3^{-1}$, while typical range from 1.3-12.5 $kgCO_2$ tmineral$^{-1}$. The chosen value is on the higher side of reported values for mining emissions, and the process is not sensitive to these emissions due to repeated reuse of MgO from the feedstock. For this analysis, it was assumed the feedstock is available at the desired particle size of 20 μm or that this particle size is achieved in a first preprocessing/calcination step. Weathering in this process takes place on land at ambient conditions. MgO is spread on land in layers 0.1 m thick and stirred daily. Values for the capital costs of this equipment are approximated as large-scale agricultural tillage equipment.

When estimating magnesite use in this system, there are two main considerations: the initial supply of magnesite to each carbonation facility and the makeup supply of magnesite each subsequent year of facility operation. For the initial supply of magnesite, there are two cases: the lower bound utilizing 3,504 carbonation plots with 5% environmental losses and the upper bound utilizing 10,512 carbonation plots with 10% environmental losses. For both cases, the initial plots are each populated with 50,000 $tMgCO_3$. The upper bound uses 525 $MtMgCO_3$ to capture 180 $MtCO_2$, or 6.2% of global reserves (estimated to be 8.5 billion tons of known, economically and legally producible magnesite). Additionally, with 10% environmental losses, the upper bound process would use 53 $MtMgCO_3$ in replacement magnesite each year or 0.6% of global reserves.

For the lower bound, the initial mineral charge is 175 $MtMgCO_3$ or 2% of global magnesite reserves to capture 64 $MtCO_2$. For makeup minerals, the upper bound assumed 5% environmental losses, corresponding to an additional 8.7 $MtMgCO_3$ per year or 0.1% of global reserves. Removing 1 $GtCO_2$ from air per year would initially charge 2.9 $GtMgCO_3$ or roughly 29% of global magnesite reserves. The makeup supply would use between 0.15-0.29 $GtMgCO_3$ per year, or roughly 1.7-3.4% of global magnesite reserves.

The system analyzed here has between 3,504 (lower bound) and 10,512 (upper bound) carbonation plots, each with 21,500 tMgO from the original 50,000 $tMgCO_3$ feedstock. The number of carbonation plots are optimized for continuous calciner operation. Since the upper bound and lower bound have 30 minute and 2 hour calcination cycles, respectively, more plots are processed per year in the upper bound scenario. By populating each plot with MgO at different times during the year, they can be recollected and calcined at varying times throughout the year. Additionally, it was assumed that 90 to 95% of the MgO will be recollected as $MgCO_3$ or unreacted MgO and between 5% and 10% of this material will be lost to the environment. Losses of $MgCO_3$ were calculated to be 0.03 to 0.05% per year and MgO will near 3 to 4% per year The magnesite feedstock was calcined at temperatures ranging from 500-1200° C. For this analysis, two sets of calcination conditions are used: 600° C. for 2 hours (lower bound) and 1200° C. for 0.5 hours (upper bound). Calcining at 600° C. for 2 hours yields a higher specific surface area (93.07 $m^2$ $g^{-1}$ for a 2-5 mm feed pre-calcination) which will aid in subsequent carbonation reactions. The calcination conditions of 1200° C. for 0.5 hours result in a decreased surface area (10.9 $m^2$ $g^{-1}$ for a 2-5 mm feed pre-calcination). For this process, the calciner is continuously operational with a capacity factor of 90% to account for routine maintenance.

An oxy-fired calciner was used, which included an air separation unit and a condenser. Combustion energy and $CO_2$ outputs were estimated for oxidation of pure methane. Following combined combustion and calcination, the gas stream was fed into the condenser where water was removed. Since oxy-fired calcination is used, the resulting flue gas stream has high concentrations of $CO_2$ and water vapor, indicating a high purity stream of $CO_2$ will be produced following condensation of water vapor. $CO_2$ removed from Mg-carbonates, and $CO_2$ produced from combustion, can be compressed and permanently stored or sold. Additionally, the condensation step produces 0.3 tons of water for every $tCO_2$ captured from air.

To move calcined MgO to the plot of land used for weathering, an electric conveyor was used. Transportation operating costs are related to electricity used by the conveyor system which was determined using motor power details for commercially available mining conveyors (373 kW (500 HP) with a capacity of 454 t $hr^{-1}$).

For recollection and delivery to conveyors, the associated pieces of equipment are assumed to be commercially available front-loading tractors. By staggering plot maturation times, central calcination equipment can be used continuously for multiple carbonation plots throughout the year. This also allows for more $CO_2$ capture without increasing the operational scale, i.e., equipment sizing or throughput.

Without wishing to be bound by theory, after undergoing repeated calcination, sintering may have a significant effect on MgO reactivity. Studies evaluating capacity losses for magnesium-based adsorbents suggest that after 10 cycles $CO_2$ uptake capacity diminishes by 5-7%. This would correspond to a capacity loss between 2 and 17% over the plant lifetime, depending on amount of makeup material and number of cycles undergone by material lost to the environment. This analysis assumes 5-10% losses in each cycle, accounting for both environmental losses and possible sintering effects so the initial MgO lasts for 10 to 20 cycles.

The largest contributions to the capital costs of the system were raw material costs at 81-86% of capital costs, the oxy-fired calciner at 9-10% of capital costs, and the air separation unit and condenser at 2-7% of the capital costs. The costing method and scaling factor used for each piece of equipment are presented in Table 2.

TABLE 2

Estimated capital expenditures (CAPEX) for the MgO looping process.

| CAPEX | Cost [M$] Lower Bound | Upper Bound |
|---|---|---|
| Raw Mineral | 8760 | 110376 |
| Air Separation Unit and Condenser[a] | 785 | 2260 |
| Oxy-Fired Calciner[a] | 930 | 12202 |
| Land | 129 | 1796 |
| Transportation (Conveyor System)[a] | 129 | 1050 |
| Stirring Equipment | 28 | 84 |
| Recollection Equipment | 22 | 67 |
| Total CAPEX [M$] | $10,783 | $127,835 |
| CAPEX Annualized [M$ $year^{-1}$] | $ 794 | $ 16,053 |
| $CO_2$ Capture from Air [$GtCO_2$ $year^{-1}$] | 0.064 | 0.198 |
| Total $CO_2$ Capture [$GtCO_2$ $year^{-1}$] | 0.12 | 0.34 |
| CAPEX [$ $tCO_2^{-1}$ Captured] | $ 12 | $ 89 |
| CAPEX [$ $tCO_2^{-1}$ Produced] | $ 7 | $ 47 |

[a]Assumed a scale-up factor

Each capital cost value is scaled to the individual process conditions. Here, the upper bound is processing 0.18 Gt $CO_2$ $year^{-1}$ using 10,512 carbonation plots and the lower bound is processing 0.06 Gt $CO_2$ $year^{-1}$ using 3,504 carbonation plots. Since the upper bound is processing about 3 times more $CO_2$ than the lower bound, the capital cost per ton $CO_2$ is significantly less for the lower bound compared to the upper bound.

Table 3 shows the energy use and energy type for each unit operation. The main energy demand of the process is for calcination which depends on calcining temperature. Therefore, the energy use per ton $CO_2$ vary between the lower and upper bounds.

TABLE 3

Energy Use for the $CO_2$ sequestration process

| Unit Operation | Energy Use Lower Bound | Upper Bound | Energy Type |
|---|---|---|---|
| Air Separation Unit and Condenser [MJ $tCO_2^{-1}$] | 300 | 300 | Electricity |
| Oxy-Fired Calciner [MJ $tCO_2^{-1}$] | 5888 | 7966 | Natural Gas |
| Transportation [MJ $tCO_2^{-1}$] | 8 | 9 | Electricity |
| Stirring Equipment [Gallons $tCO_2^{-1}$] | 0.29 | 0.31 | Gasoline |
| Recollection Equipment [Gallons $tCO_2^{-1}$] | 0.0051 | 0.0054 | Gasoline |

Table 4 details the operating costs for the $CO_2$ sequestration system. There are no variations in the cost between grid and solar electricity scenarios as the cost of electricity is identical. Variations between these energy resource scenarios arise when considering $CO_2$ emissions.

TABLE 4

Operating expenditures (OPEX) for the MgO looping process

| OPEX | Cost [M$] Lower Bound | Upper Bound |
|---|---|---|
| Maintenance | 323 | 3,835 |
| Labor | 97 | 1,151 |
| Makeup minerals | 9 | 53 |
| Gasoline | 50 | 151 |
| Natural Gas | 1,310 | 5,036 |
| Electricity | 327 | 929 |
| Total OPEX [M$] | $2,117 | $11,154 |
| Total OPEX [$ $tCO_2^{-1}$ Captured] | $ 33 | $ 62 |
| Total OPEX [$ $tCO_2^{-1}$ Produced] | $ 17 | $ 32 |

The largest contribution to operating costs is the natural gas for powering the calciner, making up 45-62% of operating costs for all scenarios. This indicates process operating costs can be sensitive to the price of natural gas. Additionally, electricity makes up 8-16©© of operating costs. Other major contributions to operation costs are maintenance (15-34%) and labor (5-10%), which are directly correlated to capital costs.

The cost of $CO_2$ combines the capital and operating costs presented in the previous sections to develop a process cost per $tCO_2$. These costs are shown in Table 5.

TABLE 5

Summary of $CO_2$ capture costs for the MgO looping process

| | Grid Electricity | Solar Electricity ($0.06 $kWh^{-1}$) | Solar Electricity ($0.03 $kWh^{-1}$) |
|---|---|---|---|
| Capture cost [$ $tCO_2^{-1}$] | 46-151 | 46-151 | 43-148 |
| Net Removal Cost [$ $tCO_2^{-1}$] | 48-159 | 46-152 | 44-149 |
| Produced Cost [$ $tCO_2^{-1}$] | 29-79 | 29-79 | 25-77 |

While the cost of capture for the solar electricity scenario is the same as for the grid electricity scenario, the cost of $CO_2$ net removed is ~4% less for the solar scenario compared to the grid scenario. This is caused by the reduction in $CO_2$ emissions associated with solar electricity versus grid electricity. Additionally, when accounting for projected cost reduction of solar electricity, the $CO_2$ net removed process cost is reduced by ~7% compared to grid electricity.

For the exemplary process presented here, the cost of $CO_2$ net removed ranges from \$46-159 $tCO_2^{-1}$ using current costs of grid and solar electricity, while the cost of $CO_2$ produced ranges from \$29-79 $tCO_2^{-1}$. Using future cost projections for solar electricity yields \$43-149 $tCO_2^{-1}$ net removed and \$25-77 $tCO_2^{-1}$ produced. Currently, DAC technologies have been demonstrated on the industrial and pilot scales with costs of $CO_2$ net removed reported at \$500-600 $tCO_2^{-1}$. Aside from industrial-scale initiatives, literature values for DAC technologies using joint carbonation and calcination processes have been described. In their analysis, the American Physical Society (APS) developed a cost estimate of \$610-780 $tCO_2^{-1}$ net removed for the aqueous calcium looping system using sodium hydroxide. By varying the packing materials used in the process and optimizing the process around this new material, a similar process at \$510-568 $tCO_2^{-1}$ net removed was developed.

Figure 3:
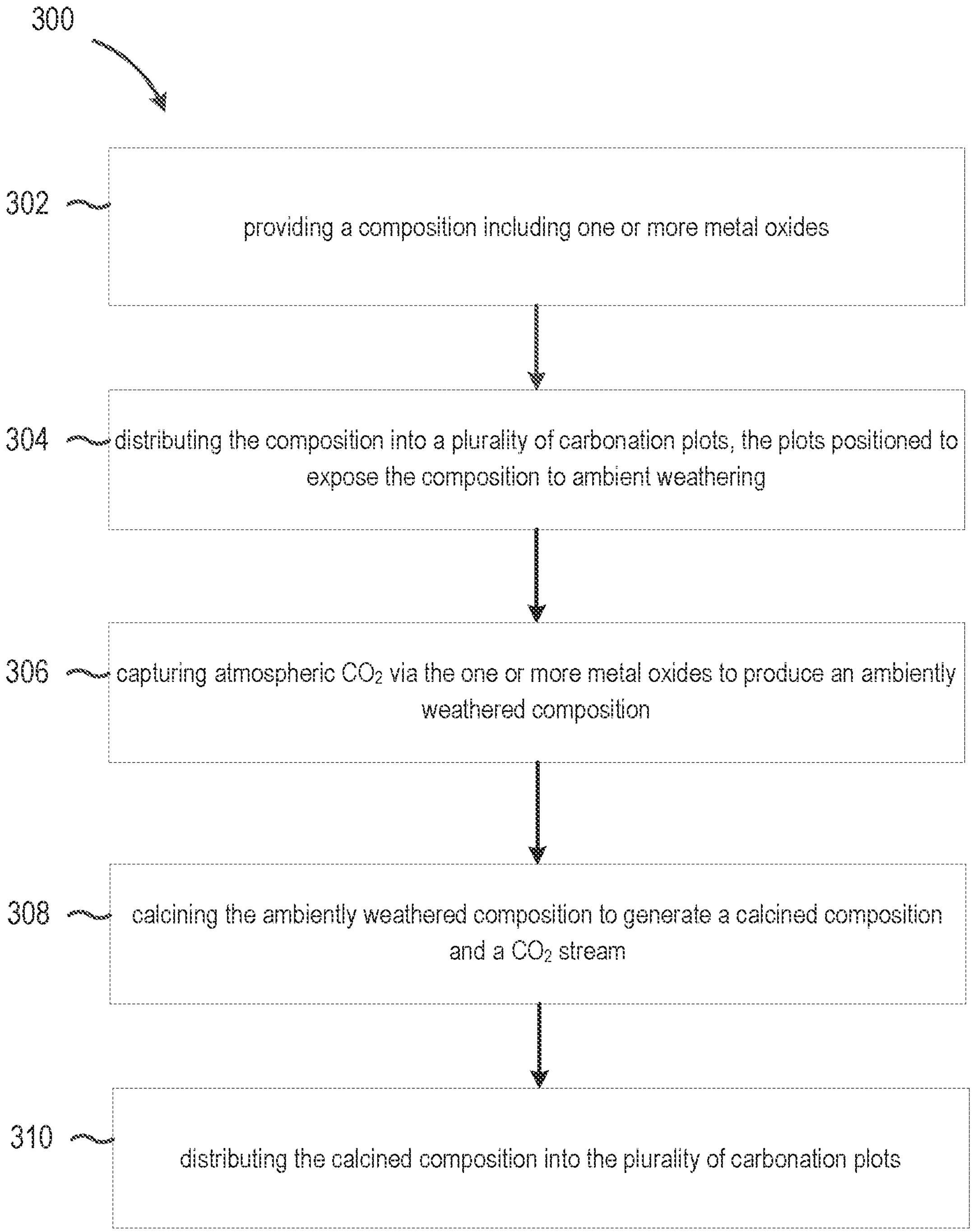
FIG. 3 is a chart of a method for utilizing alkalinity to sequester carbon dioxide from the atmosphere according to some embodiments of the present disclosure.

Referring now to FIG. 3, some embodiments of the present disclosure are directed to a method 300 for utilizing alkalinity to sequester carbon dioxide from the atmosphere. At 302, a composition including one or more metal oxides is provided. As discussed above, the one or more metal oxides includes MgO, CaO, $Na_2O$, or combinations thereof. As discussed above, the composition is at least in part composed of processed feedstock, wherein the feedstock includes magnesite, peridotite, serpentinite, olivine, serpentine, brucite, sodium carbonate, dunite, calcite, dolomite, wollastonite, pyroxenes, or combinations thereof. In some embodiments, providing 302 a composition includes grinding the feedstock to an average particle size of about 20 μm. In some embodiments, providing 302 a composition includes calcining the feedstock to produce an additional $CO_2$ stream and a calcined feedstock including the one or more metal oxides.

At 304, the composition is distributed into a plurality of carbonation plots, the plots positioned to expose the composition to ambient weathering. In some embodiments, the composition is distributed 304 to greater than about 5 carbonation plots. In some embodiments, the carbonation plots include greater than about 20,000 tons of metal oxides available for ambient weathering. In some embodiments, the composition is distributed in the carbonation plots as a layer. In some embodiments, the layer has a thickness of about 0.01 m, 0.02 m, 0.03 m, 0.04 m, 0.05 m, 0.06 m, 0.07 m, 0.08 m, 0.09, 0.1 m, 0.2 m, or 0.3 m. At 306, atmospheric $CO_2$ is captured via the one or more metal oxides to produce an ambiently weathered composition. In some embodiments, the ambiently weathered composition is recollected after a certain duration of exposure. In some embodiments, the duration of exposure is about a month, 2, months, 3 months, 4 months, 5 months, 6 months, 7 months, 8 months, 9 months, 10 months, 11 months, a year, or about 1.5 years. At 308, the ambiently weathered composition is calcined to generate a calcined composition and a $CO_2$ stream. In some embodiments, the ambiently weathered composition is calcined for a duration between about 30 minutes and about 2 hours. In some embodiments, the ambiently weathered composition is calcined at a temperature between about 500° C. and about 1200° C. At 310, the calcined composition is distributed into the plurality of carbonation plots.

In some embodiments of method 300, the composition within the plurality of carbonation plots is stirred to maximize exposure of the composition to the atmosphere. In some embodiments, the composition is stirred once a week, month, quarter, 6 months, year, etc. Any suitable system or mechanism, e.g., commercially-available farming equipment, can be used to stir the composition. Without wishing to be bound by theory, after undergoing repeated calcination, the pores in the particles of the composition begin to clog causing metal oxides to deactivate. Studies have demonstrated that the reaction capacity of CaO diminishes by greater than half the original capacity after 45 cycles. In some embodiments, a grinding process is used to periodically produce new metal oxides. Since the presence of magnesium in the original silicate structure appears to decrease this deactivation, 35 cycles at maximum carbonation capacity can be used to determine the amount of $CO_2$ captured per 'batch' of MgO from the initial pre-preprocessing step. In some cases, the number of cycles for the natural weathering system will not be limited by the deactivation, but rather by the environmental losses of MgO. In some embodiments, in the case of 10% environmental losses, the MgO is assumed to last 10 cycles on average and the periodic replacement of MgO can be built in to the operating costs.

Figure 4:
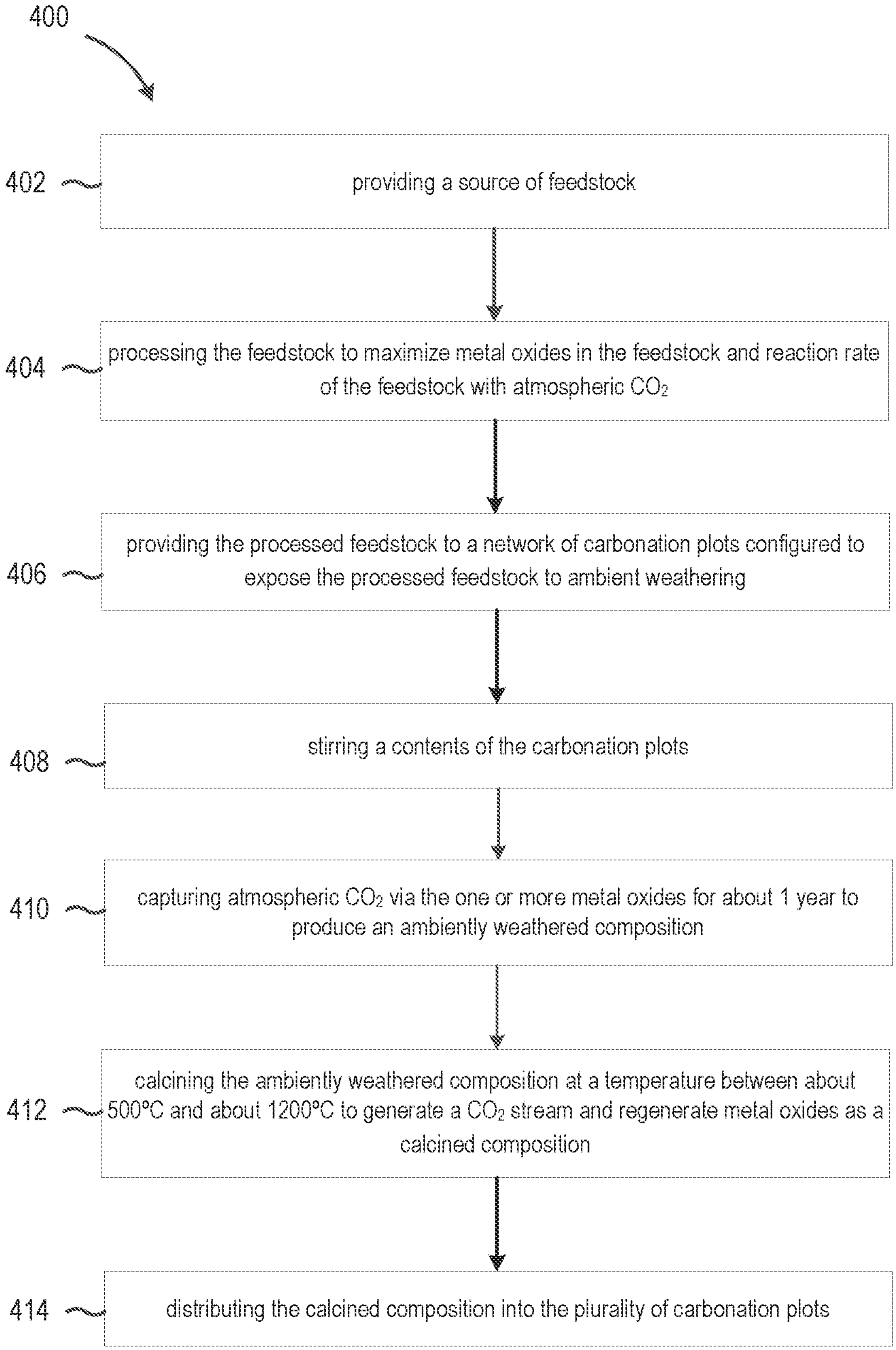
FIG. 4 is a chart of a method for utilizing alkalinity to sequester carbon dioxide from the atmosphere according to some embodiments of the present disclosure.

Referring now to FIG. 4, some embodiments of the present disclosure are directed to a method 400 for utilizing alkalinity to sequester carbon dioxide from the atmosphere. At 402, a source of feedstock is provided. As discussed above, in some embodiments, the feedstock includes magnesite, peridotite, serpentinite, olivine, serpentine, brucite, sodium carbonate, dunite, calcite, dolomite, wollastonite, pyroxenes, or combinations thereof. At 404, the feedstock is processed to maximize metal oxides in the feedstock and reaction rate of the feedstock with atmospheric $CO_2$. As discussed above, in some embodiments, the one or more metal oxides includes MgO, CaO, $Na_2O$, or combinations thereof. As discussed above, in some embodiments, processing 404 includes one or more grinding steps, one or more calcination steps, or combinations thereof. At 406, the processed feedstock is provided to a network of carbonation plots configured to expose the processed feedstock to ambient weathering. As discussed above, in some embodiments, the network of carbonation plots includes more than about 2, 3, 4, 5, 6, 7, 8, 9, 10, 20, 30, 40, 50, 60, 70, 80, 90, 100, 200, 300, 400, 500, 1,000, 1,500, 2,000, 2,500, 3,000, 3,500, 4,000, 4,500, 5,000, or 10,000 plots. At 408, a contents of the carbonation plots is stirred to maximize exposure of the metal oxides in the carbonation plots to atmospheric $CO_2$. At 410, atmospheric $CO_2$ is captured via the one or more metal oxides to produce an ambiently weathered composition, e.g., for about 1 year. At 412, the ambiently weathered composition is calcined to generate a $CO_2$ stream and regenerate metal oxides as a calcined composition, e.g., at a temperature between about 500° C. and about 1200° C. At 414, the calcined composition is distributed into the plurality of carbonation plots.

The methods and systems of the present disclosure are advantageous in that they offer a less expensive route than other current and proposed techniques to remove $CO_2$ from air. The systems and methods of the present disclosure enable capture and redistribution of "net-zero" carbon dioxide for industrial-scale uses for very abundant quarry minerals and enable large-scale low-cost carbon capture projects for municipalities or corporations. $CO_2$ captured using this method can be sold as a commodity (for carbonated beverages, enhanced oil recovery, greenhouses, etc.) or used to make (nearly) “net zero” carbon products ($CO_2$-added concrete, air-to-fuels, etc.).

$CO_2$ removal from air via the methods and systems of the present disclosure have a similar or lower cost than $CO_2$ removal using DAC with synthetic sorbents or solvents. The process is relatively simple and robust and is feasible at a reasonable cost using existing technology. Additionally, the proposed process integrates $CO_2$ capture from the oxy-fired calcination unit so the cost of produced $CO_2$, both removed from air and captured from combustion, is competitive with other sources. When compared to ideas about enhanced, surficial weathering of rocks—mine tailings, ground rock material broadcast on agricultural soils or on beaches, distributing CaO and MgO for “ocean liming”—the disclosure outlined here reduces the area footprint substantially, since one ton of CaO and MgO can be used to capture many tons of $CO_2$, year after year.

The method for $CO_2$ removal from air is also less costly than the projected, future minimum cost for CDR machines. Using low carbon energy sources, e.g., PV at a cost of $0.03/kWh, and capturing $CO_2$ emissions from the process, this process potentially removes $CO_2$ at less than $100/ton, whereas optimistic predictions of the future cost of $CO_2$ production using CDR machines yield a minimum cost of $100/ton. The cost of arable land was used to develop this analysis due to the availability of land prices. Since arable land is in higher demand due to its ability to grow crops, it is possible that the cost analysis presented here even overestimates the land cost.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method for utilizing alkalinity to sequester carbon dioxide ($CO_2$) from the atmosphere comprising:

providing a composition including one or more metal oxides;

distributing the composition into a plurality of carbonation plots, the plots positioned to expose the composition to ambient weathering;

capturing atmospheric $CO_2$ via the one or more metal oxides to produce an ambiently weathered composition;

calcining the ambiently weathered composition to generate a calcined composition and a $CO_2$ stream;

increasing a purity level of the $CO_2$ stream via at least one of an air separation unit or a condenser; and distributing the calcined composition into the plurality of carbonation plots.

2. The method according to claim 1, further comprising stirring the composition within the plurality of carbonation plots.

3. The method according to claim 1, wherein capturing atmospheric $CO_2$ via the one or more metal oxides to produce an ambiently weathered composition includes:

recollecting the composition as the ambiently weathered composition after about 1 year of exposure to the atmosphere.

4. The method according to claim 1, wherein the composition is at least in part composed of processed feedstock, wherein the feedstock includes magnesite, peridotite, serpentinite, olivine, serpentine, brucite, sodium carbonate, dunite, calcite, dolomite, wollastonite, pyroxenes, or combinations thereof.

5. The method according to claim 4, wherein providing a composition includes:

grinding the feedstock to an average particle size of about 20 μm.

6. The method according to claim 5, wherein providing a composition includes:

calcining the feedstock to produce an additional $CO_2$ stream and a calcined feedstock including the one or more metal oxides.

7. The method according to claim 1, wherein calcining the ambiently weathered composition to generate calcined composition and a $CO_2$ stream includes:

calcining the ambiently weathered composition for a duration between about 30 minutes and about 2 hours.

8. The method according to claim 1, wherein calcining the ambiently weathered composition to generate calcined composition and a $CO_2$ stream includes:

calcining the ambiently weathered composition at a temperature between about 500° C. and about 1200° C.

9. The method according to claim 1, wherein the one or more metal oxides includes MgO, CaO, $Na_2O$, or combinations thereof.

10. The method according to claim 1, wherein the plurality of carbonation plots includes greater than about 5 carbonation plots.

11. The method according to claim 1, wherein the plurality of carbonation plots includes greater than about 20,000 tons of metal oxides available for ambient weathering.

12. The method according to claim 1, wherein the composition is distributed in the plurality of carbonation plots as a layer, wherein the layer has a thickness of about 0.1 m.

* * * * *